US012798165B2

(12) United States Patent
Takanohashi

(10) Patent No.: US 12,798,165 B2
(45) Date of Patent: Nov. 17, 2026

(54) INJECTION MOLDING MACHINE AND INJECTION MOLDING MACHINE SYSTEM

(71) Applicant: SUMITOMO HEAVY INDUSTRIES, LTD., Tokyo (JP)

(72) Inventor: Ryuichi Takanohashi, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 129 days.

(21) Appl. No.: 18/904,403

(22) Filed: Oct. 2, 2024

(65) Prior Publication Data

US 2025/0114991 A1 Apr. 10, 2025

(30) Foreign Application Priority Data

Oct. 5, 2023 (JP) ................................ 2023-173511

(51) Int. Cl.
*B29C 45/18* (2006.01)
*B29C 45/23* (2006.01)

(52) U.S. Cl.
CPC .............. *B29C 45/18* (2013.01); *B29C 45/23* (2013.01)

(58) Field of Classification Search
CPC .......... B29C 45/18; B29C 45/23; B29C 45/54
USPC .......................................................... 425/585
See application file for complete search history.

(56) References Cited

U.S. PATENT DOCUMENTS

| | | | | |
|---|---|---|---|---|
| 5,833,899 A * | 11/1998 | Wunderlich | ........ | B29C 45/1603 425/572 |
| 6,576,179 B1 | 6/2003 | Abe et al. | | |

FOREIGN PATENT DOCUMENTS

| | | | | |
|---|---|---|---|---|
| CA | 2248412 C * | 7/2001 | ......... | B29C 45/1603 |
| CA | 3126015 A1 * | 1/2022 | ......... | B29C 45/7613 |
| JP | H02-281919 | 11/1990 | | |
| JP | 2001-018255 | 1/2001 | | |
| JP | 2022-027158 | 2/2022 | | |

* cited by examiner

*Primary Examiner* — Christina A Johnson
*Assistant Examiner* — Xue H Liu
(74) *Attorney, Agent, or Firm* — IPUSA, PLLC

(57) ABSTRACT

An injection molding machine includes a first reservoir cylinder and a second reservoir cylinder to which a molten resin is supplied, a first injection member provided inside the first reservoir cylinder and configured to push out the molten resin in the first reservoir cylinder, a second injection member provided inside the second reservoir cylinder and configured to push out the molten resin in the second reservoir cylinder, and an injection cylinder to which the molten resin in the first reservoir cylinder and the molten resin in the second reservoir cylinder are supplied. Upon supply of the molten resin from the first reservoir cylinder to the injection cylinder, the injection molding machine supplies the molten resin to the second reservoir cylinder, and upon supply of the molten resin from the second reservoir cylinder to the injection cylinder, the injection molding machine supplies the molten resin to the first reservoir cylinder.

8 Claims, 9 Drawing Sheets

INJECTION MOLDING MACHINE AND INJECTION MOLDING MACHINE SYSTEM

CROSS-REFERENCE TO RELATED APPLICATIONS

Priority is claimed to Japanese Patent Application No. 2023-173511, filed Oct. 5, 2023, the entire content of which is incorporated herein by reference.

BACKGROUND

1. Technical Field

The present disclosure relates to an injection molding machine and an injection molding machine system.

2. Description of Related Art

An injection molding machine that injects a molding material into a mold device by using two cylinders is known. For example, a disclosed injection molding machine includes a reservoir cylinder to which molten resin as a molding material is supplied and an injection cylinder to which the molten resin is supplied from the reservoir cylinder.

In this injection molding machine, a feed pipe for supplying a molten resin is connected to the distal end of the reservoir cylinder, and a molten resin is continuously supplied to the reservoir cylinder by a molten resin supply device on the upstream side of the feed pipe. The injection molding machine advances a first plunger of the reservoir cylinder to push out the supplied molten resin from the distal end of the reservoir cylinder and accumulate the molten resin in the front portion of the internal space of the injection cylinder. Thereafter, the injection molding machine advances the second plunger of the injection cylinder to inject the molten resin accumulated in the front of the injection cylinder into a mold device.

SUMMARY

According to an aspect of the present disclosure, an injection molding machine includes: a first reservoir cylinder and a second reservoir cylinder to which a molten resin is supplied; a first injection member provided inside the first reservoir cylinder and configured to push out the molten resin in the first reservoir cylinder; a second injection member provided inside the second reservoir cylinder and configured to push out the molten resin in the second reservoir cylinder; and an injection cylinder to which the molten resin in the first reservoir cylinder and the molten resin in the second reservoir cylinder are supplied. Upon supply of the molten resin from the first reservoir cylinder to the injection cylinder, the injection molding machine supplies the molten resin to the inside of the second reservoir cylinder, and upon supply of the molten resin from the second reservoir cylinder to the injection cylinder, the injection molding machine supplies the molten resin to the inside of the first reservoir cylinder.

DETAILED DESCRIPTION

Figure 1:
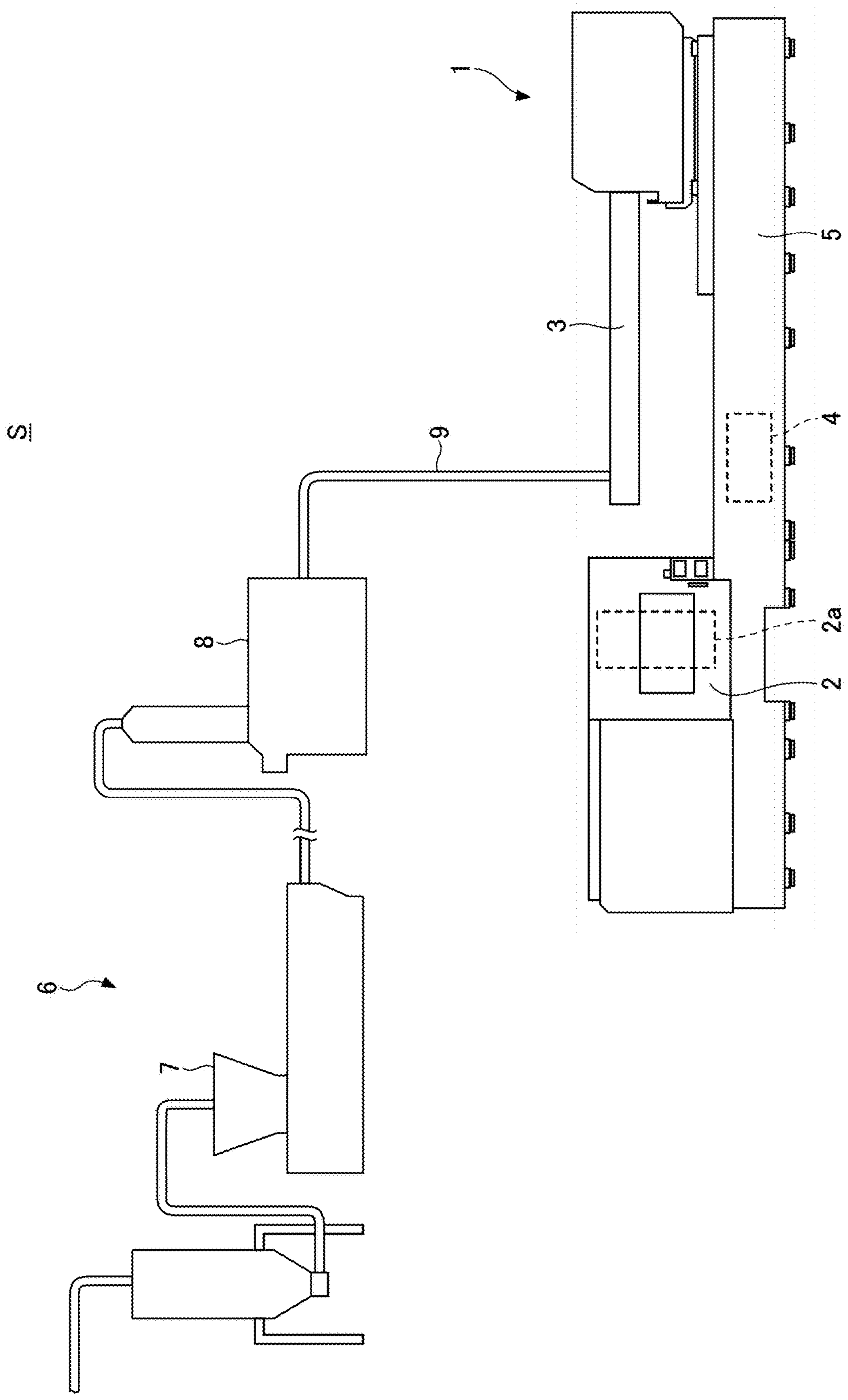
FIG. 1 is a side view illustrating an example of an overall configuration of an injection molding machine system according to an embodiment of the present disclosure.

In an injection molding machine in which molten resin is continuously supplied from a feed pipe to a reservoir cylinder, feeding a molten resin from the reservoir cylinder to an injection cylinder may cause a backflow of the molten resin stored in the reservoir cylinder toward the feed pipe.

The present disclosure provides a technique capable of preventing backflow of molten resin and stably injecting a molding material.

Hereinafter, embodiments for implementing the present disclosure will be described with reference to the drawings. In the drawings, the same components are denoted by the same reference numerals, and a duplicate description thereof may be omitted.

<Injection Molding Machine System S>

FIG. 1 is a side view illustrating an overall configuration of an injection molding machine system S according to an embodiment. As illustrated in FIG. 1, the injection molding machine system S according to the embodiment includes an injection molding machine 1 and a molten resin supply device 6.

The injection molding machine 1 includes a mold clamping device 2 that opens and closes a mold device 2*a* stored inside a case, and an injection device 3 that injects a molding material into a cavity space of the mold device 2*a*. The injection molding machine 1 also includes an ejecting device (not depicted) that ejects a molded article molded by the mold device 2*a*, a moving device (not depicted) that moves the injection device 3 forward and backward with respect to the mold device 2*a*, and a frame 5 that supports the components of the injection molding machine 1. The injection molding machine 1 further includes a controller 4 that controls each component of the injection molding machine 1.

The mold clamping device 2 sequentially performs, under the control of the controller 4, a mold closing step of causing the movable mold of the mold device 2*a* to touch the fixed mold, a pressure increasing step of increasing the mold clamping force, a mold clamping step of maintaining the mold clamping force, a pressure releasing step of reducing the mold clamping force, a mold opening step of separating the movable mold from the fixed mold, and the like.

The injection device 3 performs a metering step, a filling step, a dwelling step, and the like under the control of the controller 4. Hereinafter, the filling step and the dwelling step are also collectively referred to as an "injection step". The operation of the injection device 3 will be described in detail later.

The ejecting device performs, based on a control command of the controller 4, an ejection step consisting of advancing an ejector rod (not depicted) from a standby position to an ejection position to eject a molded article and subsequently retracting the ejector rod to the original standby position.

The moving device moves the injection device 3 forward and backward relative to the mold device 2*a*. By advancing the injection device 3 toward the mold device 2*a*, the injection device 3 is pressed against the fixed mold of the mold device 2*a*. By retracting the injection device 3, the injection device 3 is separated from the fixed mold of the mold device 2*a*.

The controller 4 repeatedly performs the above-described metering step, mold closing step, pressure increasing step, mold clamping step, filling step, dwelling step, cooling step, pressure releasing step, mold opening step, ejection step, and the like, thereby repeatedly manufacturing a molded product. A series of operations for obtaining a molded article, for example an operation from the start of a metering step to the start of a next metering step is also referred to as a "molding cycle". A time required for one molding cycle is referred to as a "molding cycle time".

One molding cycle includes, for example, a metering step, a mold closing step, a pressurizing step, a mold clamping step, a filling step, a dwelling step, a cooling step, a pressure releasing step, a mold opening step, and an ejection step in this order. The order here is the order of the start of each step. The filling step, the dwelling step, and the cooling step are performed during the mold clamping step. The start of the mold clamping step may coincide with the start of the filling step. The end of the pressure releasing step coincides with the start of the mold opening step.

Multiple steps may be performed simultaneously for the purpose of shortening a molding cycle time. For example, the metering step may be performed during the cooling step of a previous molding cycle, or may be performed during the mold clamping step. In this case, the mold closing step may be performed at the beginning of a molding cycle. The filling step may be started during the mold closing step. The ejection step may be started during the mold opening step. The mold opening step may be started during the metering step.

One molding cycle may further include a step other than the metering step, the mold closing step, the pressure increasing step, the mold clamping step, the filling step, the dwelling step, the cooling step, the pressure releasing step, the mold opening step, and the ejection step.

The molten resin supply device 6 melts a resin, which is an example of a molding material, to generate a molten resin, and continuously supplies the molten resin to the injection device 3 of the injection molding machine 1. Examples of the resin include a polyethylene terephthalate resin (PET resin). The molten resin supply device 6 according to the embodiment directly melts (without pelletizing) thin pieces (flakes) of a molded product of a PET resin, such as a PET bottle, to generate a molten resin. This makes it possible to omit the step of cooling and crystallizing the molten resin into pellets and the steps of drying, heating, and melting the pellets of the resin, thereby reducing the energy consumption in an entire injection molding step. The molten resin supply device 6 may melt a pellet-shaped resin to generate a molten resin.

The molten resin supply device 6 includes a drying and pressure feeding device 7 that dries the flake PET resin and supplies the resin to the downstream side under pressure, and a melting and pressure feeding device 8 that melts the PET resin on the downstream side of the drying and pressure feeding device 7 and supplies the resin to the downstream side under pressure. The molten resin supply device 6 includes a feed pipe 9 that connects the melt pumping device 8 and the injection device 3 and supplies the molten resin of the melt pumping device 8 to the injection device 3. The feed pipe 9 may include, for example, a heat insulator that covers the pipe, a heater that keeps the molten resin flowing through the pipe warm, and the like.

Although FIG. 1 illustrates a configuration in which one injection molding machine 1 is connected to the feed pipe 9, the injection molding machine system S is not limited to this configuration and may have a configuration in which a plurality of injection molding machines 1 are connected to the feed pipe 9. Further, although FIG. 1 illustrates a configuration in which one molten resin supply device 6 is connected to the feed pipe 9, the injection molding machine system S is not limited thereto and may have a configuration in which a plurality of molten resin supply devices 6 are connected to the feed pipe 9.

Thus, the foregoing molten resin supply device 6 continuously supplies the molten resin to the injection device 3 under pressure through the feed pipe 9 by continuously operating the drying pressure feeding device 7 and the melting pressure feeding device 8. In this case, in the injection molding machine system S, the molten resin supply device 6 continuously supplies a molten resin, while the injection molding machine 1 intermittently injects the molten resin. Therefore, for example, the injection molding machine system S may experience difficulty in stopping the supply of the molten resin from the molten resin supply device 6 immediately upon a stoppage of the injection molding machine 1 due to an error or the like.

<Configuration of Injection Device 3 According to the Embodiment>

Figure 2:
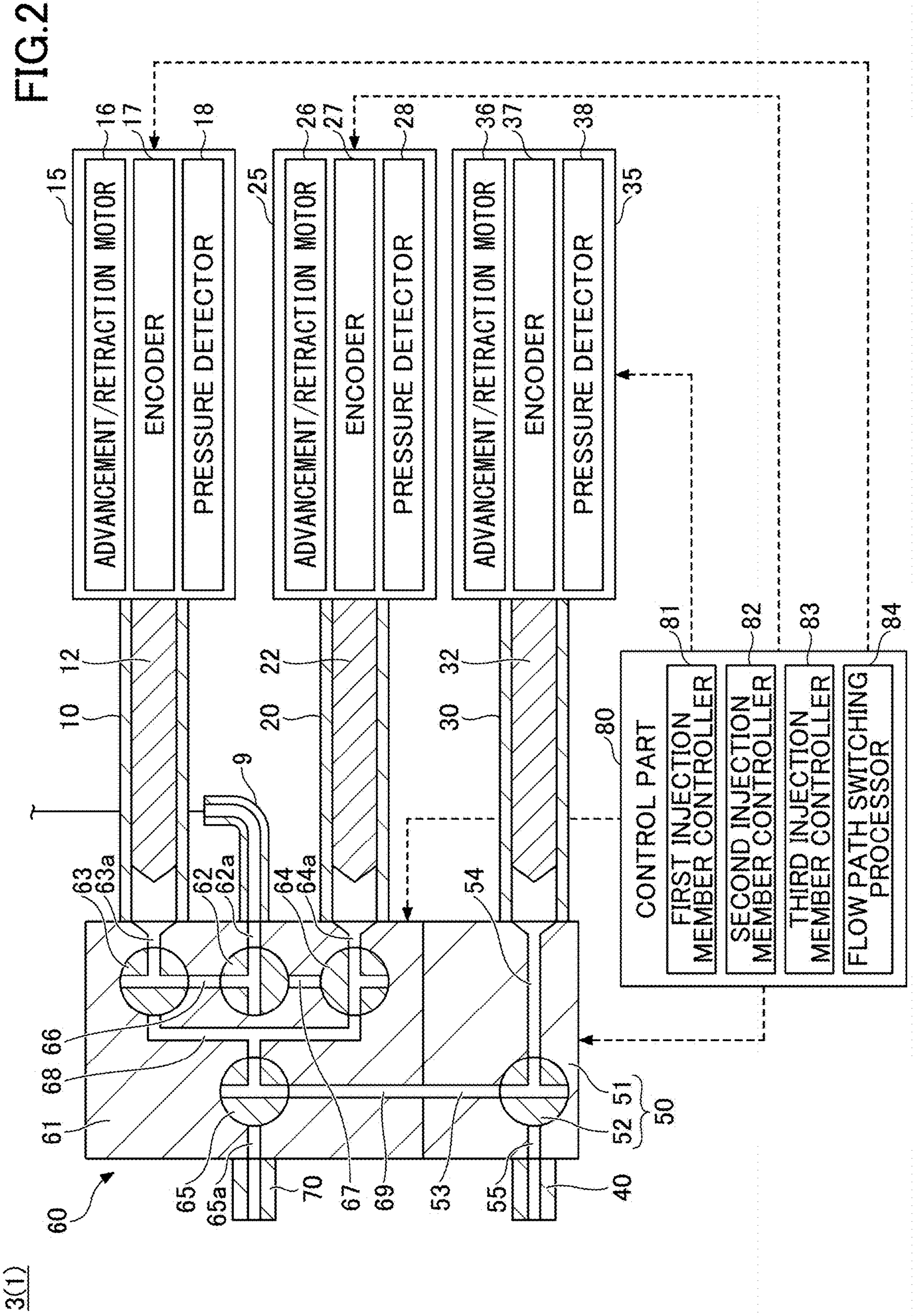
FIG. 2 is a cross-sectional view schematically illustrating an injection device of the injection molding machine according to the embodiment.

From this point of view, in the injection molding machine system S according to the embodiment, the injection device 3, to which a molten resin is continuously supplied, is configured to intermittently inject a molten resin while receiving the continuously supplied molten resin. Hereinafter, the configuration of the injection device 3 will be described in detail with reference to FIG. 2. FIG. 2 is a cross-sectional view schematically illustrating the injection device 3 of the injection molding machine 1 according to the embodiment.

Figure 4A:
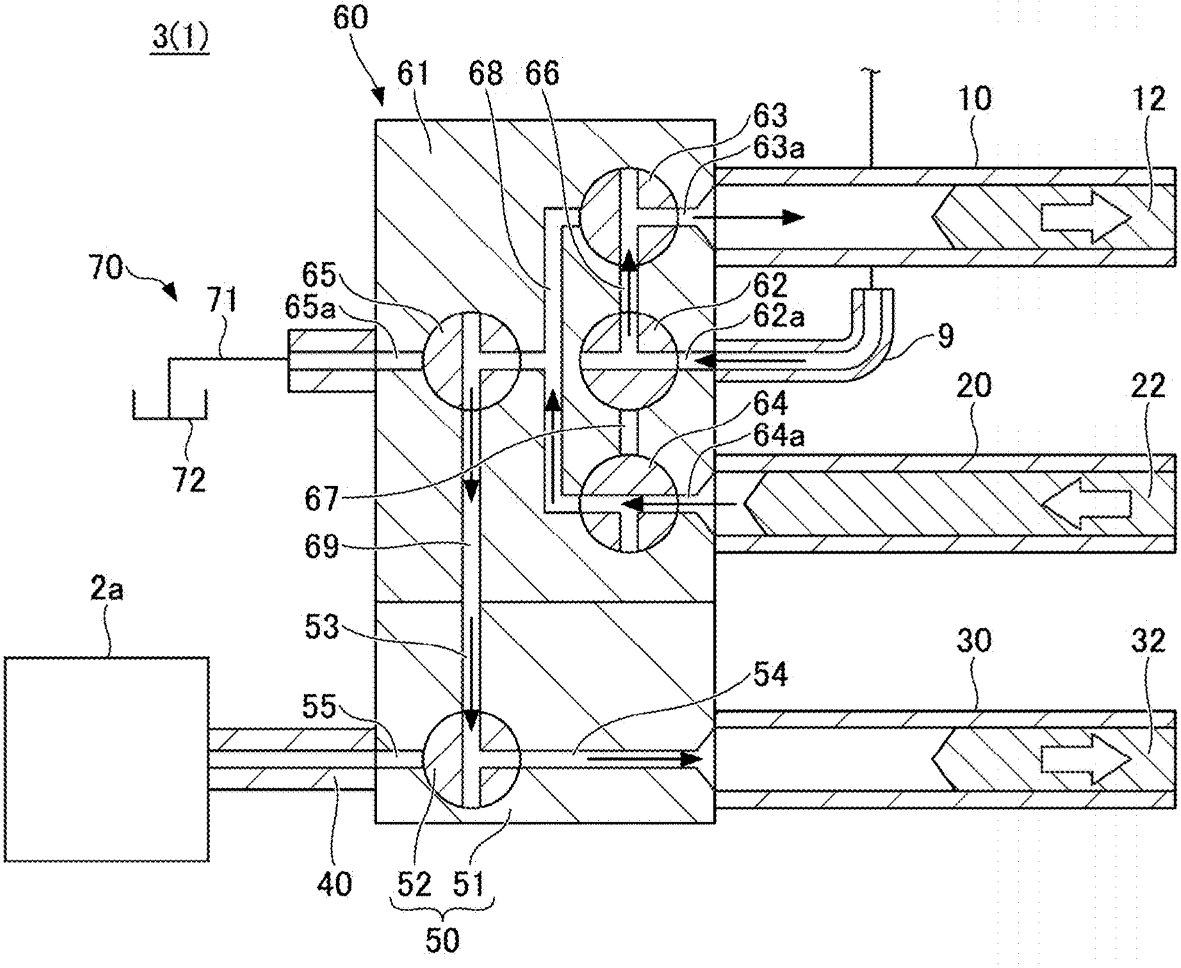
FIG. 4A is a cross-sectional view illustrating an operation example of the injection cylinder in a metering step.

The injection device 3 of the injection molding machine 1 injects molten resin into the mold device 2*a* using three cylinders (see also FIG. 4A). The injection device 3 includes a first reservoir cylinder 10 and a second reservoir cylinder 20 for temporarily storing a molten resin, and an injection cylinder 30 for injecting the molten resin into the mold device 2*a*. A first reservoir plunger (first injection member) 12 that can advance and retract with respect to the first reservoir cylinder 10 is provided inside the first reservoir cylinder 10. A second reservoir plunger (second injection member) 22 that can advance and retract with respect to the second reservoir cylinder 20 is provided inside the second reservoir cylinder 20. An injection plunger (third injection member) 32 which can advance and retract with respect to the injection cylinder 30 is provided inside the injection cylinder 30.

The injection device 3 includes a first injection member driver 15 that operates the first reservoir plunger 12, a second injection member driver 25 that operates the second reservoir plunger 22, and a third injection member driver 35 that operates the injection plunger 32. The injection device 3 further includes an injection nozzle 40, an injection switching valve 50, a reservoir switching valve 60, a discharger 70, and a control part 80.

The first reservoir cylinder 10 is formed in a cylindrical shape extending in a horizontal direction. The reservoir switching valve 60 is connected to the distal end of the first reservoir cylinder 10, and the first injection member driver 15 is installed at the proximal end of the first reservoir cylinder 10. A molten resin is supplied to the internal space of the first reservoir cylinder 10 from the distal end via the reservoir switching valve 60. A heating device (not depicted) for keeping the temperature of or heating a molten resin supplied to the internal space may be installed in the cylindrical wall constituting the first reservoir cylinder 10.

The first reservoir plunger 12 is formed as a solid rod member, and advances in the internal space of the first reservoir cylinder 10 to push out a molten resin supplied to the internal space. The axial center of the first reservoir plunger 12 is arranged coaxially with the axial center of the first reservoir cylinder 10. The outer peripheral surface of the first reservoir plunger 12 is a smooth curved surface, and the outer diameter thereof is set to be the same as (or slightly smaller than) the inner diameter of the first reservoir cylinder 10. As a result, the first reservoir plunger 12 moves forward and backward (slides) relative to the first reservoir cylinder 10, and thereby moves a molten resin in the internal space of the first reservoir cylinder 10.

The first injection member driver 15 closes the proximal end of the first reservoir cylinder 10 and holds the proximal end of the first reservoir plunger 12. For example, the first injection member driver 15 includes an advancement/retraction motor 16, an encoder 17, and a pressure detector 18.

The advancement/retraction motor 16 advances and retracts the first reservoir plunger 12 along the axial center of the first reservoir cylinder 10. A motion converting mechanism for converting the rotational motion of the advancement/retraction motor 16 into the linear motion of the first reservoir plunger 12 is provided between the first reservoir plunger 12 and the advancement/retraction motor 16. For example, a ball screw can be applied as the motion conversion mechanism.

The encoder 17 detects the rotation of the advancement/retraction motor 16 and transmits the detection signal thereof to the control part 80. The control part 80 calculates the position and the moving speed of the first reservoir plunger 12 based on the detection signal of the encoder 17, and controls the operation of the first reservoir plunger 12 using the calculation results.

The pressure detector 18 is provided in a transmission path between the advancement/retraction motor 16 and the first reservoir plunger 12, detects a force transmitted between the advancement/retraction motor 16 and the first reservoir plunger 12, and transmits a detection signal thereof to the control part 80. The control part 80 calculates the pressure of the first reservoir plunger 12 from the detection signal, and adjusts or monitors the pressure received by the first reservoir plunger 12 from the molding material (the back pressure to the first reservoir plunger 12), the pressure acting on the molding material from the first reservoir plunger 12, and the like.

The second reservoir cylinder 20 is configured in the same manner as the first reservoir cylinder 10. Specifically, the second reservoir cylinder 20 is formed in a cylindrical shape extending in a horizontal direction (a direction parallel to the first reservoir cylinder 10). The reservoir switching valve 60 is connected to the distal end of the second reservoir cylinder 20, and the second injection member driver 25 is installed at the proximal end of the second reservoir cylinder 20. A molten resin is supplied to the internal space of the second reservoir cylinder 20 from the distal end via the reservoir switching valve 60. A heating device (not depicted) that keeps warm or heats a molten resin supplied to the internal space may be installed in the cylindrical wall constituting the second reservoir cylinder 20.

The second reservoir plunger 22 is formed as a solid rod member, and advances in the internal space of the second reservoir cylinder 20 to push out a molten resin supplied to the internal space. The axial center of the second reservoir plunger 22 is arranged coaxially with the axial center of the second reservoir cylinder 20. The outer peripheral surface of the second reservoir plunger 22 is a smooth curved surface, and the outer diameter thereof is set to be the same as (or slightly smaller than) the inner diameter of the second reservoir cylinder 20. Thus, the second reservoir plunger 22 moves forward and backward (slides) relative to the second reservoir cylinder 20, and thereby moves the molding material in the internal space of the second reservoir cylinder 20.

The second injection member driver 25 closes the proximal end of the second reservoir cylinder 20 and holds the proximal end of the second reservoir plunger 22. For example, the second injection member driver 25 includes an advancement/retraction motor 26, an encoder 27, and a pressure detector 28.

The advancement/retraction motor 26 advances and retracts the second reservoir plunger 22 along the axial center of the second reservoir cylinder 20. A motion conversion mechanism for converting the rotational motion of the advancement/retraction motor 26 into the linear motion of the second reservoir plunger 22 is provided between the second reservoir plunger 22 and the advancement/retraction motor 26. For example, a ball screw can be applied as the motion conversion mechanism.

The encoder 27 detects the rotation of the advancement/retraction motor 26 and transmits the detection signal to the control part 80. The control part 80 calculates the position and the moving speed of the second reservoir plunger 22 based on the detection signal of the encoder 27, and controls the operation of the second reservoir plunger 22 using the calculation results.

The pressure detector 28 is provided in a transmission path between the advancement/retraction motor 26 and the second reservoir plunger 22, detects a force transmitted between the advancement/retraction motor 26 and the second reservoir plunger 22, and transmits a detection signal thereof to the control part 80. The control part 80 calculates a pressure of the second reservoir plunger 22 based on the detection signal, and adjusts or monitors a pressure received by the second reservoir plunger 22 from the molding material (a back pressure against the second reservoir plunger 22), a pressure acting on the molding material from the second reservoir plunger 22, and the like.

On the other hand, the injection cylinder 30 is formed in a cylindrical shape extending in parallel (in the horizontal direction) to the first reservoir cylinder 10 and the second reservoir cylinder 20. The injection switching valve 50 is connected to the distal end of the injection cylinder 30, and the third injection member driver 35 is installed at the proximal end of the injection cylinder 30. A molten resin is supplied to the internal space of the injection cylinder 30 from the distal end side via the injection switching valve 50. A heating device (not depicted) that keeps warm or heats a molten resin supplied to the internal space may be installed in the cylinder wall constituting the injection cylinder 30.

The injection plunger 32 is formed as a solid rod member similarly to the first reservoir plunger 12 and the second reservoir plunger 22, and advances in the internal space of the injection cylinder 30 to thereby push out the molten resin supplied to the internal space. The axis of the injection plunger 32 is arranged coaxially with the axis of the injection cylinder 30. The outer peripheral surface of the injection plunger 32 is a smooth curved surface, and the outer diameter thereof is set to be the same diameter as (or slightly smaller than) the inner diameter of the injection cylinder 30. As a result, the injection plunger 32 moves forward and backward (slides) relative to the injection cylinder 30 to move the molding material in the internal space of the injection cylinder 30.

The third injection member driver 35 closes the proximal end of the injection cylinder 30 and holds the proximal end of the injection plunger 32. The third injection member driver 35 also has an advancement/retraction motor 36, an encoder 37, and a pressure detector 38, similarly to the first injection member driver 15.

The advancement/retraction motor 36 moves the injection plunger 32 back and forth along the axis of the injection cylinder 30. A motion converting mechanism for converting the rotational motion of the advancement/retraction motor 36 into the linear motion of the injection plunger 32 is provided between the injection plunger 32 and the advancement/retraction motor 36. For example, a ball screw can be applied as the motion conversion mechanism.

The encoder 37 detects the rotation of the advancement/retraction motor 36 and transmits a detection signal thereof to the control part 80. The control part 80 calculates the position and the moving speed of the injection plunger 32 based on the detection signal of the encoder 37, and controls the operation of the injection plunger 32 using these calculation results.

The pressure detector 38 is provided in a transmission path between the advancement/retraction motor 36 and the injection plunger 32, detects a force transmitted between the advancement/retraction motor 36 and the injection plunger 32, and transmits a detection signal thereof to the control part 80. The control part 80 calculates a pressure of the injection plunger 32 based on the detected force, and adjusts or monitors a pressure received by the injection plunger 32 from the molding material (a back pressure against the injection plunger 32), a pressure acting on the molding material from the injection plunger 32, and the like.

The injection nozzle 40 of the injection device 3 is arranged at a position opposite to the injection cylinder 30 in the injection switching valve 50, and is formed in a cylindrical body communicating with a flow path (e.g., a runner) of the mold device 2*a*. The injection nozzle 40 allows a molten resin pushed out from the injection cylinder 30 to flow through the injection switching valve 50 and injects the molten resin into the mold device 2*a*. The mold device 2*a* molds a molded article through solidification of the molten resin filled into the cavity space via the injection nozzle 40.

The injection switching valve 50 is provided between the injection cylinder 30, the injection nozzle 40, and the reservoir switching valve 60, and switches the flow of a molten resin. The injection switching valve 50 is an example of an injection switch, which corresponds to a switch of the present disclosure. Specifically, in the metering step of the injection device 3, the injection switching valve 50 diverts a molten resin flowing from the reservoir switching valve 60 to the injection cylinder 30. In the injection step of the injection device 3, the injection switching valve 50 changes the connections inside the device by disconnecting the communication between the injection cylinder 30 and the reservoir switching valve 60 and connecting the injection cylinder 30 to the mold device 2*a* so as to enable injection. Thus, upon a molten resin flowing in from the injection cylinder 30, the injection switching valve 50 allows the molten resin to be injected into the mold device 2*a*. In the injection device 3 of the embodiment, the injection switching valve 50 and the reservoir switching valve 60 are separate devices, but these may constitute a single device. The injection switching valve 50 includes a valve box 51, a valve body 52, and a valve body driver (not depicted).

The valve box 51 is formed in a substantially rectangular parallelepiped shape and houses the valve body 52 therein. The valve box 51 has a supply connection flow path 53 communicating with the flow path of the reservoir switching valve 60, an injection cylinder connection flow path 54 communicating with the internal space of the injection cylinder 30, and a nozzle connection flow path 55 communicating with the inside of the injection nozzle 40. The injection cylinder connection flow path 54 and the nozzle connection flow path 55 extend in opposite directions to each other with the rotation center line of the valve body 52 interposed therebetween, for example. The supply connection flow path 53 extends, for example, in a direction orthogonal to an axis line connecting the injection cylinder connection flow path 54 and the nozzle connection flow path 55.

The valve body 52 is formed in a spherical shape and is rotatable relative to the valve box 51. A flow path having a T-shape in a cross-sectional view is formed inside the valve body 52. The valve body 52 thereby switches the injection switching valve 50 between a first state and a second state. In the first state, the valve body 52 allows the supply connection flow path 53 and the injection cylinder connection flow path 54 to communicate with each other, and closes the nozzle connection flow path 55. In the second state, the valve body 52 allows the injection cylinder connection flow path 54 and the nozzle connection flow path 55 to communicate with each other, and closes the supply connection flow path 53 (see also FIG. 4B). Thus, in the first state, a molten resin can be moved from the reservoir switching valve 60 toward the injection cylinder 30. In the second state, a molten resin can be moved from the injection cylinder 30 to the injection nozzle 40.

The valve body driver switches between the first state and the second state by rotating the valve body 52 within the valve box 51. The state of the valve body 52 is not limited to the first state and the second state. For example, the valve body 52 can be in a state of simultaneously closing the supply connection flow path 53, the injection cylinder connection flow path 54, and the nozzle connection flow path 55. The valve body 52 can be in a state of blocking the injection cylinder connection flow path 54 while allowing the supply connection flow path 53 and the nozzle connection flow path 55 to communicate with each other.

The reservoir switching valve 60 is provided between the feed pipe 9, the first reservoir cylinder 10, the second reservoir cylinder 20, the injection switching valve 50, and the discharger 70, and switches the flow of a molten resin. The reservoir switching valve 60 is an example of a reservoir switch, which corresponds to a switch of the present disclosure. Specifically, upon a molten resin flowing in from the feed pipe 9, the reservoir switching valve 60 causes the molten resin to selectively flow in either the first reservoir cylinder 10 or the second reservoir cylinder 20. Furthermore, in the metering step of the injection device 3, the reservoir switching valve 60 performs internal switching to allow a molten resin to flow in from the first reservoir cylinder 10 or the second reservoir cylinder 20, in turn, into the injection switching valve 50. The reservoir switching valve 60 includes a valve box 61, four valve bodies (a supply switching valve body 62, a first reservoir valve body 63, a second reservoir valve body 64, and a discharge switching valve body 65), and a valve body driver (not depicted).

The valve box 61 is formed in a substantially rectangular parallelepiped shape and houses the four valve bodies. Each valve body is formed in a spherical shape and is rotatable relative to the valve box 61. A flow path having a T-shape in a cross-sectional view is formed inside each valve body. For example, the first reservoir valve body 63, the supply switching valve body 62, and the second reservoir valve body 64 are provided so as to be arranged in this order along the longitudinal direction of the valve box 61. The discharge switching valve body 65 is provided at a position aligned with the position of the supply switching valve body 62 (a middle position in the longitudinal direction) along the short direction of the valve box 61.

A flow path for molten resin is provided between the valve bodies in the valve box 61. Specifically, the valve box 61 has a supply flow path 62*a* communicating with the flow path of the feed pipe 9, a first reservoir connection flow path 63*a* communicating with the internal space of the first reservoir cylinder 10, and a second reservoir connection flow path 64*a* communicating with the internal space of the second reservoir cylinder 20. The valve box 61 includes a first reservoir flow path 66 connecting the supply switching valve body 62 and the first reservoir valve body 63, a second reservoir flow path 67 connecting the supply switching valve body 62 and the second reservoir valve body 64, an intermediate flow path 68 connecting the first reservoir valve body 63, the second reservoir valve body 64, and the discharge switching valve body 65, and a discharge connection flow path 69 communicating with the supply connection flow path 53 of the injection switching valve 50 from the discharge switching valve body 65. The valve box 61 further includes a discharge flow path 65*a* that communicates with the flow path of the discharger 70.

The valve bodies are rotated independently of each other by the valve body driver, and thereby the direction of each valve body in the valve box 61 is adjusted; as a result, a flow path and a discretionarily selected flow path of each valve body are communicated with each other, and the communication between a flow path and another flow path of each valve body is blocked. The direction of each valve body during the supply of a molten resin will be described in detail in the description of an operation method.

The discharger 70 includes a discharge pipe 71 connected to the reservoir switching valve 60 and an externally provided disposer 72 connected to the injection device 3 via the discharge pipe 71. A molten resin is discharged to the disposer 72 through a discharge pipe 71 based on the switching of the reservoir switching valve 60.

The function of the control part 80 may be implemented by any hardware, software, or a combination thereof. For example, the control part 80 may be a computer including a processor, a memory, an input/output interface, and a communication interface, which are not illustrated. The processor is one or a combination of a central processing unit (CPU), a graphics processing unit (GPU), an application specific integrated circuit (ASIC), a field-programmable gate array (FPGA), a circuit including a plurality of discrete semiconductors, and the like, and executes a program stored in the memory. The memory includes a main storage device consisting of a semiconductor memory or the like, and an auxiliary storage device consisting of a disk, a semiconductor memory (flash memory), or the like.

The control part 80 controls the operation of each component of the injection device 3 (the first injection member driver 15, the second injection member driver 25, the third injection member driver 35, the injection switching valve 50, the reservoir switching valve 60, and the like) based on various commands of the controller 4 that controls the entire injection molding machine system S. The injection molding machine system S may have a configuration in which the controller 4 also serves as the control part 80 of the injection device 3, in other words, directly controls the injection device 3.

The control part 80 configures a first injection member controller 81, a second injection member controller 82, a third injection member controller 83, and a flow path switching processor 84 therein by the processor reading and executing the program of the memory. The first injection member controller 81 controls the operation of the first reservoir plunger 12. The second injection member controller 82 controls the operation of the second reservoir plunger 22. The third injection member controller 83 controls the operation of the injection plunger 32. The flow path switching processor 84 controls each state of the injection switching valve 50 and the reservoir switching valve 60 to switch a flow direction of a molten resin.

<Operation of Injection Device 3>

Figure 3:
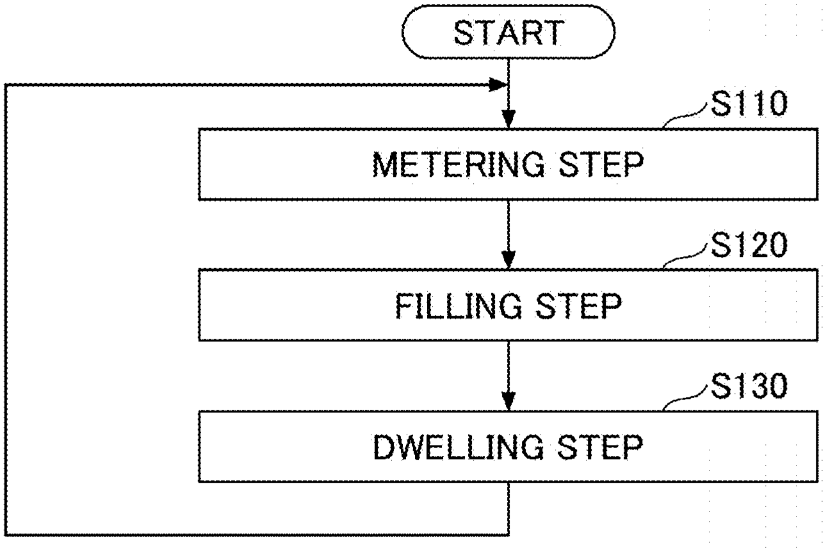
FIG. 3 is a flowchart illustrating an operation example of the injection device when viewed with reference to an injection cylinder.

Next, the operation of the injection device 3 of the injection molding machine 1 is described with reference to FIG. 3. FIG. 3 is a flowchart illustrating the operation of the injection device 3 when viewed with reference to the injection cylinder 30. The injection device 3 sequentially performs, under the control of the control part 80, a metering step (step S110), a filling step (step S120), and a dwelling step (step S130), which are depicted in FIG. 3, and repeats these steps.

In the metering step, the injection device 3 accumulates a predetermined amount of molten resin on the distal end side (in front of the injection plunger 32) of the internal space of the injection cylinder 30. In the filling step, the injection device 3 fills the cavity space of the mold device 2*a* via the injection nozzle 40 with the molten resin accumulated during the metering step by advancing the injection plunger 32 of the injection cylinder 30. In the dwelling step, the injection device 3 injects the molten resin remaining in the injection cylinder 30 by pushing out the molten resin toward the mold device 2*a* while maintaining the pressure (dwelling pressure) of the molten resin that is present ahead of the injection plunger 32 at a predetermined pressure. The injection molding machine 1 starts the cooling step after the dwelling step to solidify the molten resin in the cavity space of the mold device 2*a*. For the purpose of shortening a molding cycle time, the injection molding machine 1 may perform the metering step during the cooling step.

Figure 4B:
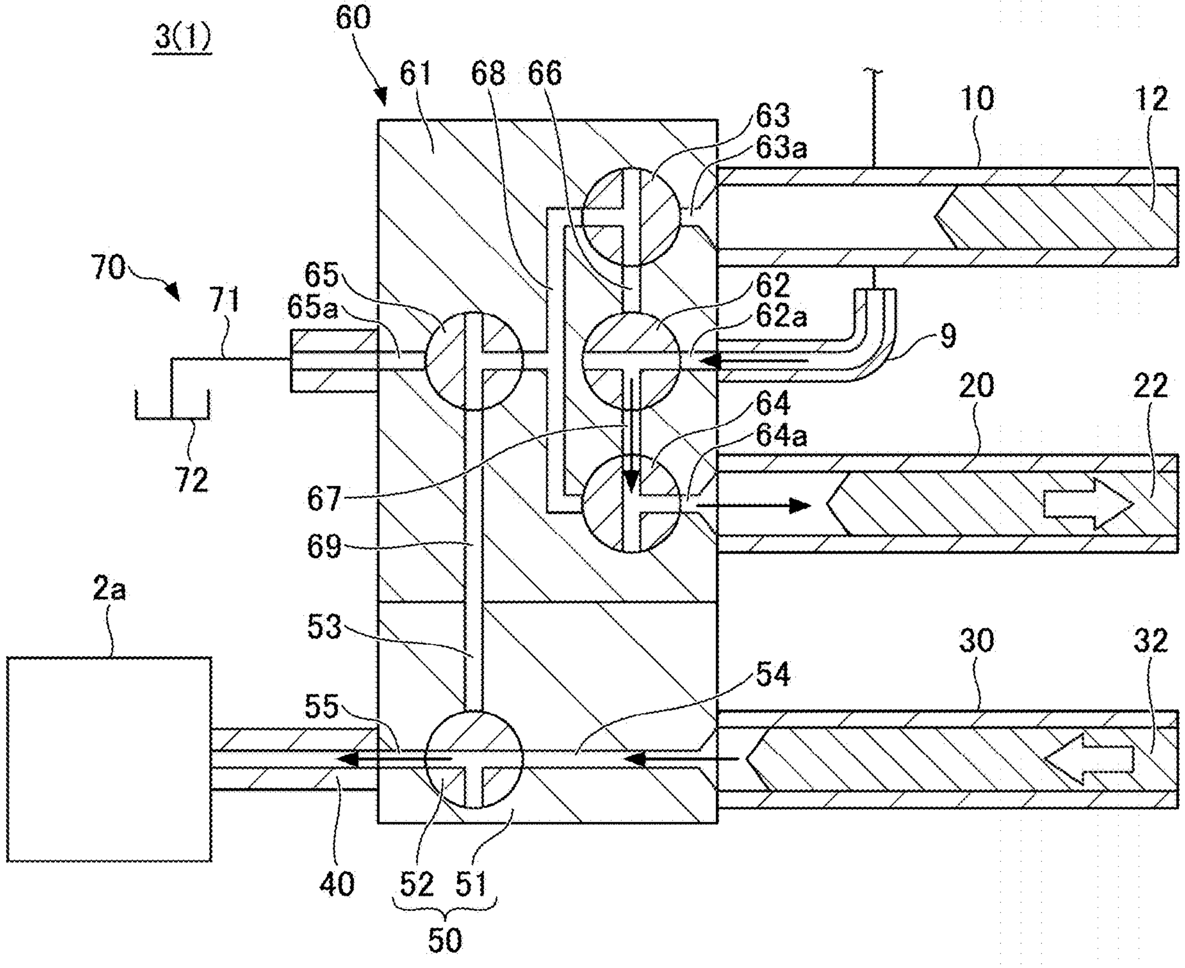
FIG. 4B is a cross-sectional view illustrating an operation example of the injection cylinder in an injection step.
Figure 5A:
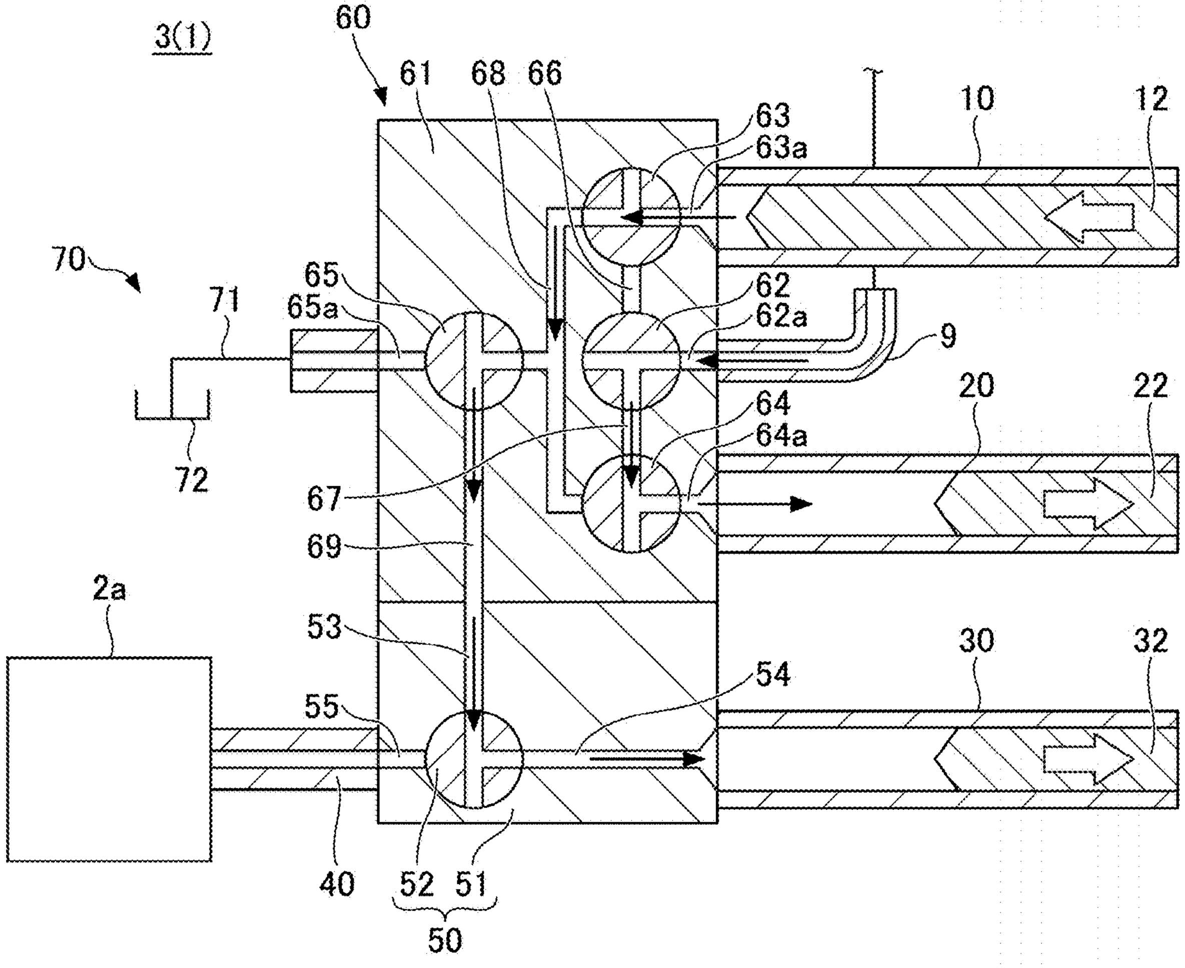
FIG. 5A is a cross-sectional view illustrating an operation example of a reservoir cylinder during the metering step in the injection cylinder.
Figure 5B:
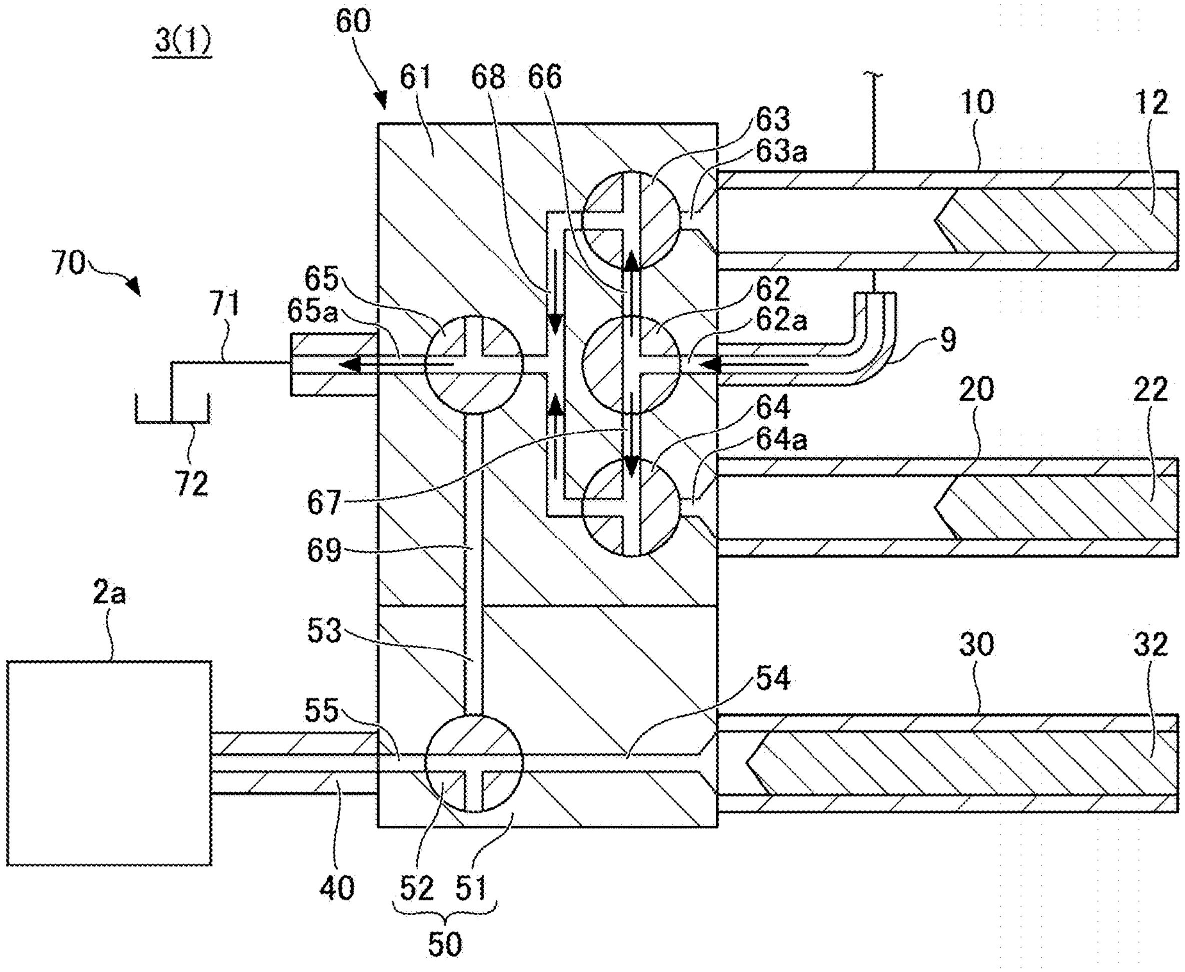
FIG. 5B is a cross-sectional view illustrating an operation example of discharging molten resin.

The injection device 3 selects the first reservoir cylinder 10 or the second reservoir cylinder 20 to control the metering and the injection on the reservoir side during the metering step and the injection step (the filling step, the dwelling step). Hereinafter, specific operations in each step will be described with reference to FIGS. 4A through 5B. FIG. 4A is a cross-sectional view illustrating an operation of the injection cylinder 30 in the metering step. FIG. 4B is a view illustrating an operation of the injection cylinder 30 in the injection step. FIG. 5A is a cross-sectional view illustrating an operation of a reservoir cylinder in the metering step in the injection cylinder 30. FIG. 5B is a diagram illustrating an operation of discharging a molten resin.

In the metering step (step S110), the control part 80 selects a cylinder in which a predetermined amount of molten resin is stored (metered) from among the reservoir side first reservoir cylinder 10 and second reservoir cylinder 20. For example, FIG. 4A illustrates an example where the molten resin is moved from the second reservoir cylinder 20 to the injection cylinder 30 as the molten resin is stored in the second reservoir cylinder 20. The flow path switching processor 84 of the control part 80 controls the valve body driver of the injection switching valve 50 and the valve body driver of the reservoir switching valve 60 in accordance with the selection, and sets each valve body to the direction illustrated in FIG. 4A.

Specifically, the valve body 52 of the injection switching valve 50 is adjusted by the valve body driver in a direction (first state) in which the supply connection flow path 53 and the injection cylinder connection flow path 54 communicate with each other. On the other hand, in the reservoir switching valve 60, the second reservoir valve body 64 is adjusted in a direction in which the second reservoir connection flow path 64*a* and the intermediate flow path 68 are communicated with each other and the second reservoir flow path 67 is blocked. The discharge switching valve body 65 is adjusted in a direction in which the intermediate flow path 68 and the discharge connection flow path 69 are communicated with each other and the discharge flow path 65*a* is blocked. Thus, the second reservoir cylinder 20 and the injection cylinder 30 communicate with each other through the second reservoir connection flow path 64*a*, the second reservoir valve body 64, the intermediate flow path 68, the discharge switching valve body 65, the discharge connection flow path 69, the supply connection flow path 53, the valve body 52, and the injection cylinder connection flow path 54.

After the direction of each valve body is adjusted by the flow path switching processor 84, the control part 80 drives the advancement/retraction motor 26 by the second injection member controller 82 to advance the second reservoir plunger 22 of the second reservoir cylinder 20. At this time, the second injection member controller 82 calculates the position or the moving speed of the second reservoir plunger 22 based on the detection value of the encoder 17, and controls the moving speed of the second reservoir plunger 22. The second reservoir plunger 22 pushes out the molten resin accumulated in front of the second reservoir plunger 22 in the internal space of the second reservoir cylinder 20 from the distal end of the second reservoir cylinder 20. The molten resin in the second reservoir cylinder 20 moves through the second reservoir connection flow path 64*a*, the second reservoir valve body 64, the intermediate flow path 68, the discharge switching valve body 65, and the discharge connection flow path 69 in the reservoir switching valve 60. At this time, the second reservoir valve body 64 blocks the second reservoir flow path 67, thereby preventing a back-flow of the molten resin into the feed pipe 9 via the second reservoir flow path 67. Then, the molten resin pushed out from the reservoir switching valve 60 flows into the internal space of the injection cylinder 30 via the supply connection flow path 53, the valve body 52, and the injection cylinder connection flow path 54 of the injection switching valve 50.

Upon the molten resin flowing into the injection cylinder 30, the injection plunger 32 of the injection cylinder 30 is pushed by the molten resin and moves backward in the injection cylinder 30. The control part 80 may drive the advancement/retraction motor 36 by the third injection member controller 83 to actively retract the injection plunger 32 in conjunction with the inflow of the molten resin. This makes it possible to lower the pressure of the molten resin supplied to the injection cylinder 30 and reduce the load on the second reservoir plunger 22.

To move the molten resin from the second reservoir cylinder 20 to the injection cylinder 30, the control part 80 fills the first reservoir cylinder 10 with the molten resin continuously supplied from the feed pipe 9. For this reason, in adjustment of each valve body of the reservoir switching valve 60, the flow path switching processor 84 adjusts the supply switching valve body 62 and the first reservoir valve body 63 at the same time. Specifically, the supply switching valve body 62 is adjusted in a direction in which the supply flow path 62*a* and the first reservoir flow path 66 are communicated with each other and the second reservoir flow path 67 is blocked. The first reservoir valve body 63 is adjusted in a direction in which the first reservoir connection flow path 63*a* and the first reservoir flow path 66 are communicated with each other and the intermediate flow path 68 is blocked.

As a result, the supply flow path 62*a*, the supply switching member 62, the first reservoir flow path 66, the first reservoir valve body 63, and the first reservoir connection flow path 63*a* are brought into communication with each other, and the molten resin in the feed pipe 9 flows into the first reservoir cylinder 10. In the first reservoir cylinder 10, the molten resin is accumulated by the first reservoir plunger 12 moving backward in accordance with the inflow of the molten resin. At this time, the control part 80 may drive the advancement/retraction motor 16 by the first injection member controller 81 to actively retract the first reservoir plunger 12 in conjunction with the inflow of the molten resin.

After the metering step, the control part 80 starts the filling step (step S120). The flow path switching processor 84 of the control part 80 controls the valve body driver of the injection switching valve 50 and the valve body driver of the reservoir switching valve 60 to set each valve body to the direction illustrated in FIG. 4B.

Specifically, the valve body 52 of the injection switching valve 50 is adjusted by the valve body driver in a direction (second state) in which the injection cylinder connection flow path 54 and the nozzle connection flow path 55 are communicated with each other and the supply connection flow path 53 is blocked. Then, the third injection member controller 83 of the control part 80 drives the advancement/retraction motor 36 to advance the injection plunger 32 to a predetermined position. At this time, the third injection member controller 83 calculates the position or the moving speed of the injection plunger 32 based on the detection value of the encoder 37, and controls the moving speed of the injection plunger 32. The injection plunger 32 discharges the molten resin accumulated in front of the injection plunger 32 in the internal space of the injection cylinder 30 from the distal end of the injection cylinder 30. The molten resin in the injection cylinder 30 moves to the injection nozzle 40 via the injection switching valve 50, flows through the flow path of the injection nozzle 40, and is filled into the cavity space of the mold device 2*a*.

In the injection step (filling step) in which the injection cylinder 30 injects a molten resin into the mold device 2*a*, the injection device 3 performs a process (reservoir storage step) of supplying a molten resin to the cylinder (second reservoir cylinder 20) that has supplied the molten resin to the injection cylinder 30 in a previous metering step. However, the supply of the molten resin to the second reservoir cylinder 20 may be performed after the supply of the molten resin to the first reservoir cylinder 10 performed in the metering step is finished.

Upon supply of the molten resin to the second reservoir cylinder 20, the flow path switching processor 84 of the control part 80 adjusts the direction of each valve body of the reservoir switching valve 60. For example, the supply switching valve body 62 is adjusted to a direction in which the supply flow path 62*a* and the second reservoir flow path 67 are communicated with each other and the first reservoir flow path 66 is blocked. The first reservoir valve body 63 is adjusted to a direction to block the first reservoir connection flow path 63*a*. The second reservoir valve body 64 is adjusted to a direction in which the second reservoir connection flow path 64*a* and the second reservoir flow path 67 are communicated with each other and the intermediate flow path 68 is blocked.

As a result, the supply flow path 62*a*, the supply switching member 62, the second reservoir flow path 67, the second reservoir valve body 64, and the second reservoir connection flow path 64*a* are brought into communication with each other, and the molten resin in the feed pipe 9 flows into the second reservoir cylinder 20. In the second reservoir cylinder 20, the molten resin is stored by the second reservoir plunger 22 moving backward in accordance with the inflow of the molten resin. At this time, the control part 80 may drive the advancement/retraction motor 26 by the second injection member controller 82 to actively retract the second reservoir plunger 22 in conjunction with the inflow of the molten resin.

After the filling step, the control part 80 starts the dwelling step (step S130). In this case, the third injection member controller 83 of the control part 80 controls the rotation of the advancement/retraction motor 36 based on the detection value of the pressure detector 38 so as to keep the pressure (dwelling pressure) of the molten resin pushed out by the injection plunger 32 at a predetermined pressure, thereby advancing the injection plunger 32. The advancement movement of the injection plunger 32 allows the injection plungers 32 to push out the molten resin remaining in the internal space of the injection cylinder 30 toward the mold device 2*a*. The control part 80 may continue the above-described reservoir storing step in the dwelling step.

After the dwelling step is finished, the injection molding machine 1 returns to step S110 again and starts the metering step of the injection cylinder 30. As described above, the control part 80 selects a cylinder in which a predetermined amount of molten resin is stored (metered) from the first reservoir cylinder 10 and the second reservoir cylinder 20 on the reservoir side. As illustrated in FIGS. 4A and 4B, since the molten resin is stored in the first reservoir cylinder 10, the control part 80 selects to move the molten resin in the first reservoir cylinder 10 to the injection cylinder 30, and sets each valve body to the direction illustrated in FIG. 5A.

Specifically, the valve body 52 of the injection switching valve 50 is adjusted by the valve body driver in a direction (first form) in which the supply connection flow path 53 and the injection cylinder connection flow path 54 are communicated with each other. On the other hand, in the reservoir switching valve 60, the first reservoir valve body 63 is adjusted in a direction in which the first reservoir connection flow path 63*a* and the intermediate flow path 68 are communicated with each other and the first reservoir flow path 66 is blocked. The discharge switching valve body 65 is adjusted in a direction in which the intermediate flow path 68 and the discharge connection flow path 69 are communicated with each other and the discharge flow path 65*a* is blocked. Thus, the first reservoir cylinder 10 and the injection cylinder 30 are communicated with each other through the first reservoir connection flow path 63*a*, the first reservoir valve body 63, the intermediate flow path 68, the discharge switching valve body 65, the discharge connection flow path 69, the supply connection flow path 53, the valve body 52, and the injection cylinder connection flow path 54.

After the direction of each valve body is adjusted by the flow path switching processor 84, the control part 80 causes the first injection member controller 81 to drive the advancement/retraction motor 16 so as to advance the first reservoir plunger 12 of the first reservoir cylinder 10. At this time, the first injection member controller 81 calculates the position or the moving speed of the first reservoir plunger 12 based on the detection value of the encoder 17, and controls the moving speed of the first reservoir plunger 12. The first reservoir plunger 12 discharges the molten resin accumulated in front of the first reservoir plunger 12 in the internal space of the first reservoir cylinder 10 from the distal end of the first reservoir cylinder 10. The molten resin in the first reservoir cylinder 10 moves through the first reservoir connection flow path 63*a*, the first reservoir valve body 63, the intermediate flow path 68, the discharge switching valve body 65, and the discharge connection flow path 69 in the reservoir switching valve 60. At this time, the first reservoir valve body 63 blocks the first reservoir flow path 66, thereby preventing the molten resin from flowing back to the first reservoir flow path 66. Then, the molten resin pushed out from the reservoir switching valve 60 flows into the internal space of the injection cylinder 30 via the supply connection flow path 53, the valve body 52, and the injection cylinder connection flow path 54 of the injection switching valve 50.

To allow the molten resin to be stored in the injection cylinder 30, the injection plunger 32 of the injection cylinder 30 is pushed by the molten resin and moves backward in the injection cylinder 30. In this case, the control part 80 may cause the third injection member controller 83 to drive the advancement/retraction motor 36 to actively retract the injection plunger 32 in conjunction with the inflow of the molten resin.

Further, in the case where the molten resin is moved from the first reservoir cylinder 10 to the injection cylinder 30, the control part 80 fills, continuously from the injection step (dwelling step) of FIG. 4B, the second reservoir cylinder 20 with the molten resin continuously supplied from the feed pipe 9. Therefore, the supply switching valve body 62 allows the supply flow path 62*a* to communicate with the second reservoir flow path 67, and the second reservoir valve body 64 allows the second reservoir connection flow path 64*a* to communicate with the second reservoir flow path 67.

As a result, the supply flow path 62*a*, the supply switching member 62, the second reservoir flow path 67, the second reservoir valve body 64, and the second reservoir connection flow path 64*a* are brought into communication with each other, and the molten resin in the feed pipe 9 flows into the second reservoir cylinder 20. In the second reservoir cylinder 20, the molten resin is stored by the second reservoir plunger 22 moving backward in accordance with the inflow of the molten resin.

Figure 6:
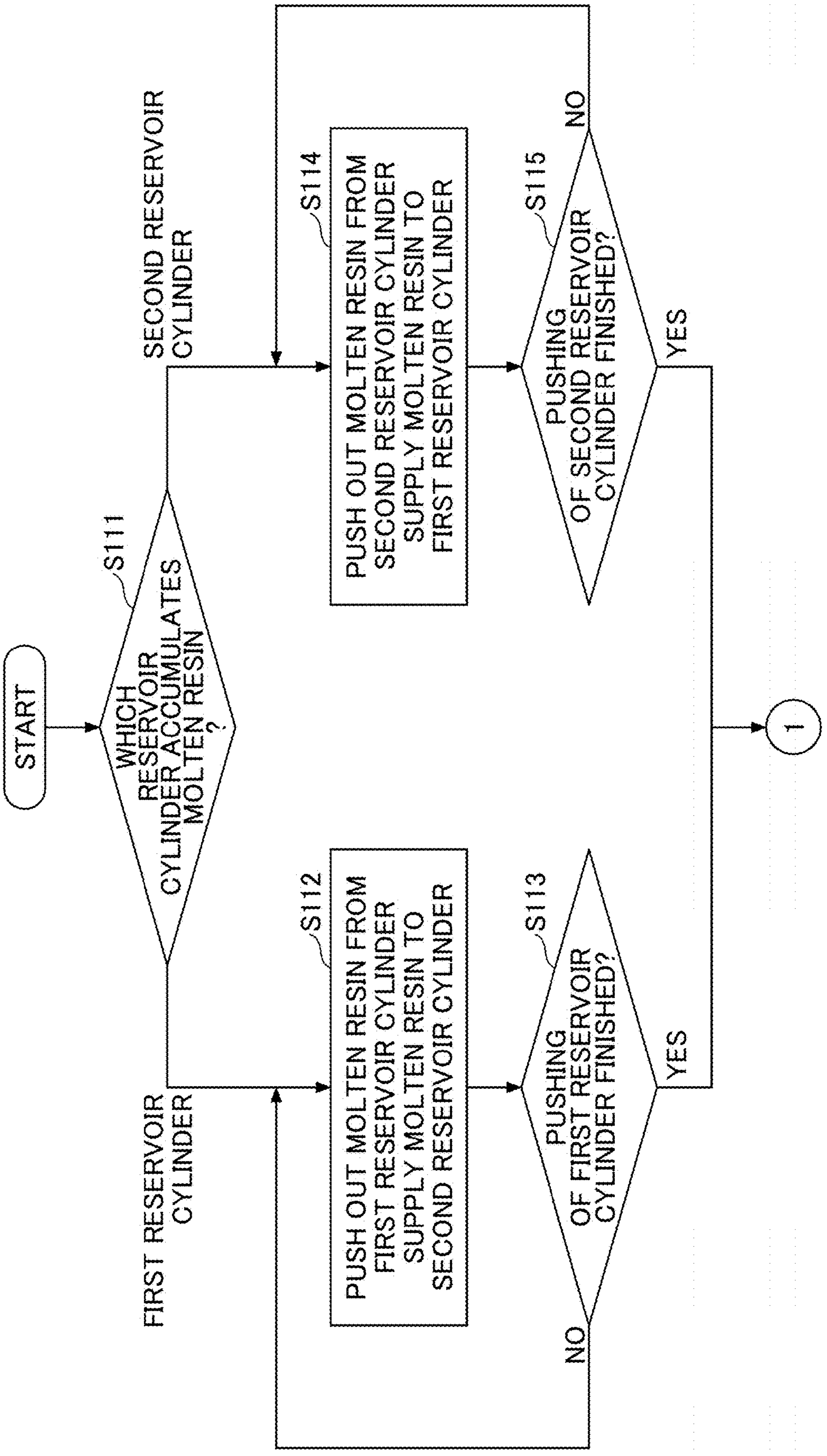
FIG. 6 is a first flowchart illustrating a control example of the first reservoir cylinder and the second reservoir cylinder and a control example of the injection cylinder.
Figure 7:
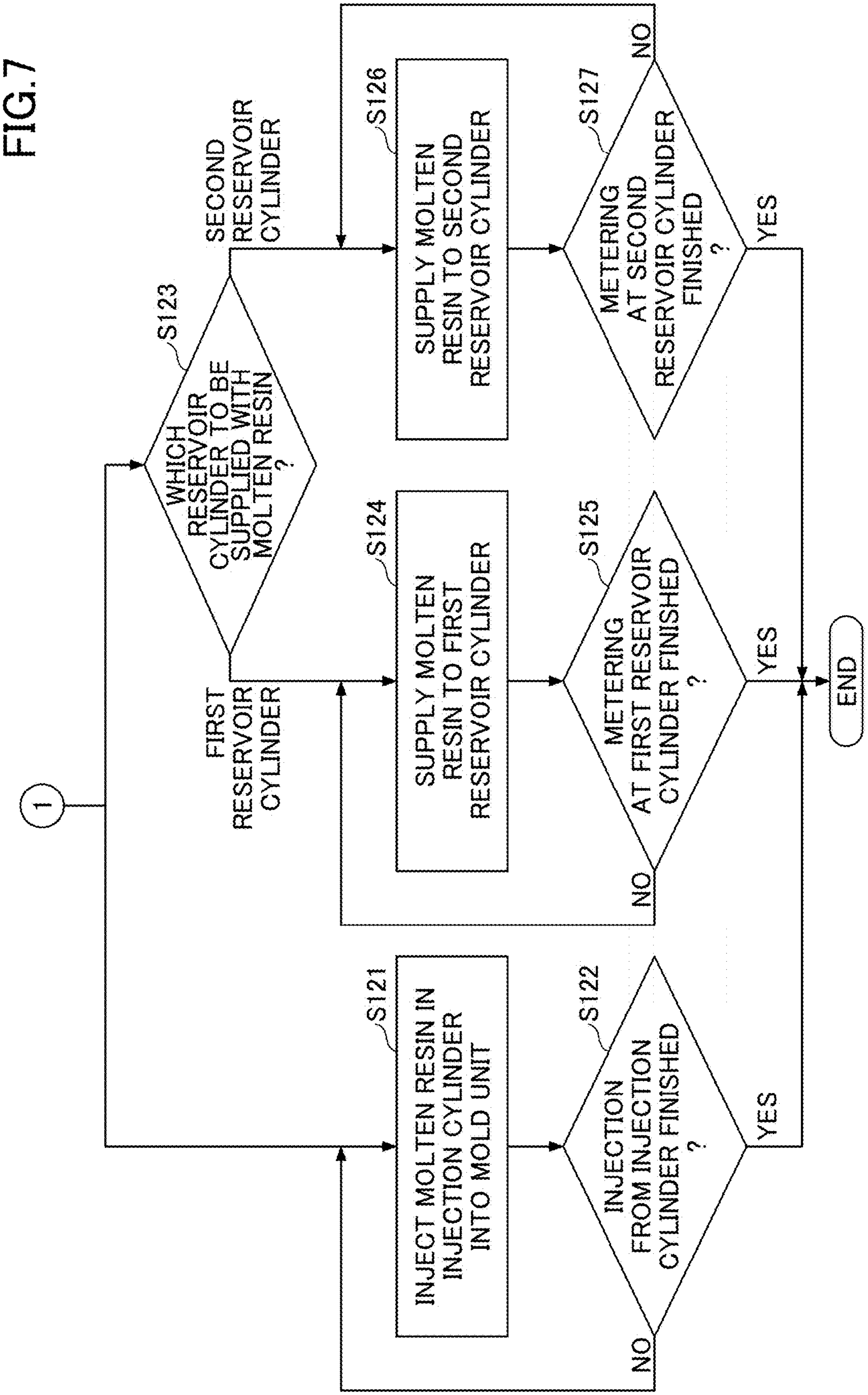
FIG. 7 is a second flowchart illustrating a control example of the first reservoir cylinder and the second reservoir cylinder and a control example of the injection cylinder.

FIG. 6 is a first flowchart illustrating control of the first reservoir cylinder 10 and the second reservoir cylinder 20 and control of the injection cylinder 30. FIG. 7 is a second flowchart illustrating the control of the first reservoir cylinder 10 and the second reservoir cylinder 20 and the control of the injection cylinder 30. The above-described control of the switching of the molten resin in the injection device 3 is summarized as in the flowcharts illustrated in FIGS. 6 and 7.

In the metering step, the control part 80 first selects a reservoir cylinder storing a molten resin (step S111). For example, to store a molten resin in the first reservoir cylinder 10, the process proceeds to step S112, and to store a molten resin in the second reservoir cylinder 20, the process proceeds to step S114.

In step S112, the control part 80 advances the first reservoir plunger 12 to move the molten resin from the first reservoir cylinder 10 to the injection cylinder 30, and supplies the molten resin from the feed pipe 9 to the second reservoir cylinder 20. Then, the control part 80 monitors the retraction position of the injection plunger 32 and determines whether or not the filling of the injection cylinder 30 with the molten resin has been completed (step S113). If the filling of the molten resin has not been completed (No in step S113), the control part 80 returns to step S112 and repeats the same process. Upon completion of the filling of the molten resin (Yes in step S113), the control part 80 completes the metering step from the first reservoir cylinder 10 to the injection cylinder 30, and proceeds to the injection step (the filling step, the dwelling step).

In step S114, the control part 80 advances the second reservoir plunger 22 to move the molten resin from the second reservoir cylinder 20 to the injection cylinder 30, and supplies the molten resin from the feed pipe 9 to the first reservoir cylinder 10. Then, the control part 80 monitors the retraction position of the injection plunger 32 and determines whether or not the filling of the injection cylinder 30 with the molten resin has been completed (step S115). If the filling of the molten resin has not been completed (No in step S115), the control part 80 returns to step S114 and repeats the same process. Upon completion of the filling of the molten resin (Yes in step S115), the control part 80 finishes the metering step from the second reservoir cylinder 20 to the injection cylinder 30, and shifts to the injection step.

In the injection step, the control part 80 advances the injection plunger 32 to inject the molten resins filled (metered) in the injection cylinder 30 into the mold device 2*a* (step S121). At this time, the control part 80 adjusts the pressure of the molten resin injected into the mold device 2*a* by performing the filling step and the dwelling step.

Furthermore, the control part 80 monitors the advancement position of the injection plunger 32 in the injection step to monitor whether or not the injection of the molten resin into the mold device 2*a* is completed (step S122). If the injection of the molten resin has not been completed (No in step S122), the process returns to step S121 and the same process is repeated. If the injection of the molten resin has been completed (Yes in step S122), the injection step by the injection cylinder 30 is completed. The metering step and the injection step of the injection cylinder 30 are set to a period earlier than a period for supplying the molten resin to one reservoir cylinder. Therefore, in response to completion of the injection step of the injection cylinder 30, the control part 80 temporarily waits until the reservoir storing step is finished.

The control part 80 supplies the molten resin from the feed pipe 9 to the reservoir side in parallel with the injection step of the injection cylinder 30. Specifically, the control part 80 selects a reservoir cylinder to which the molten resin is to be supplied (step S123). For example, the control part 80 continues the supply of the molten resin in the injection step for the reservoir cylinder to which the molten resin is supplied in the metering step. In response to completion of the supply of the molten resin from the reservoir cylinder that has been supplying the molten resin in the metering step, the control part 80 may switch to another reservoir cylinder to continue the supply of the molten resin. This makes it possible to avoid the stop of the supply of the molten resin from the feed pipe 9.

For example, the control part 80 supplies the molten resin from the feed pipe 9 to the first reservoir cylinder 10 based on the determination in step S123 (step S124). The control part 80 monitors the retraction position of the first reservoir plunger 12 to determine whether the filling of the first reservoir cylinder 10 with the molten resin has been completed (step S125). If the filling of the molten resin has not been completed (No in step S125), the control part 80 returns to step S123 and repeats the same process. If the filling of the molten resin is completed (Yes in step S125), the control part 80 ends the reservoir storage step for the first reservoir cylinder 10.

Further, for example, the control part 80 supplies the molten resin from the feed pipe 9 to the second reservoir cylinder 20 based on the determination of step S123 (step S126). The control part 80 monitors the retraction position of the second reservoir plunger 22 to determine whether the filling of the second reservoir cylinder 20 with the molten resin has been completed (step S127). If the filling of the molten resin has not been completed (No in step S127), the control part 80 returns to step S123 and repeats the same process. If the filling of the molten resin has been completed (Yes in step S127), the control part 80 ends the reservoir storage step for the second reservoir cylinder 20.

The control part 80 repeats the above process flow, and thus, the molded article can be repeatedly molded by the injection molding machine 1. During injection molding, a molten resin continuously fed from the feed pipe 9 is alternately stored in the first reservoir cylinder 10 and the second reservoir cylinder 20 as described above, and is pushed out into the injection cylinder 30. While a molten resin is being pushed out from one reservoir cylinder, the molten resin is supplied to the other reservoir cylinder. Thus, the injection device 3 can smoothly switch the supply of the molten resin continuously supplied from the feed pipe 9 without any interruption, and can prevent clogging or backflow of the molten resin. Furthermore, even in an event of an injection of the molten resin with the injection plunger 32, the injection device 3 can stably fill the reservoir cylinder with the molten resin by supplying the molten resin to either one of the first reservoir cylinder 10 or the second reservoir cylinder 20.

In particular, since the reservoir switching valve 60 is connected to the distal end of the first reservoir cylinder 10 and the distal end of the second reservoir cylinder 20, a molten resin can be supplied from the distal end of the first reservoir cylinder 10 and the distal end of the second reservoir cylinder 20. Thus, the filling, expulsion, and the like of a molten resin can be performed while avoiding the deterioration of the molten resin due to the rotation of a screw. Moreover, the switching of the reservoir switching valve 60 between the first reservoir cylinder 10 and the second reservoir cylinder 20 makes it possible to store the molten resin continuously supplied via the feed pipe 9 without interruption.

Since the injection device 3 includes the injection switching valve 50 which is connected to the distal end of the injection cylinder 30 and connected to the reservoir switching valve 60, it is possible to stably perform the metering step and the injection step in the injection cylinder 30. Furthermore, since the reservoir switching valve 60 includes the discharger 70 that discharges a molten resin, the reservoir switching valve 60 can allow the molten resin to be discharged from the injection switching valve 50 in a case where a supply of the molten resin needs to be stopped due to an error or the like in response to a stoppage of the injection molding machine 1, and clogging or backflow of the feed pipe 9 can be thereby prevented.

In addition, the injection molding machine 1 may stop the injection of a molten resin into the mold device 2*a* due to an error in an apparatus or the like. At this time, the injection device 3 performs control to guide the molten resin supplied from the molten resin supply device 6 to the reservoir switching valve 60 to the discharger 70 and discard the molten resin. For example, the flow path switching processor 84 of the control part 80 controls the valve body driver of the injection switching valve 50 and the valve body driver of the reservoir switching valve 60 to set each valve body to the direction illustrated in FIG. 5B.

Specifically, the supply switching valve body 62 is adjusted in a direction in which the supply flow path 62*a*, the first reservoir flow path 66, and the second reservoir flow path 67 are communicated with each other. The first reservoir valve body 63 is adjusted in a direction in which the first reservoir flow path 66 and the intermediate flow path 68 communicate with each other. The second reservoir valve body 64 is adjusted in a direction to allow the second reservoir flow path 67 and the intermediate flow path 68 to communicate with each other. The discharge switching valve body 65 is adjusted in a direction in which the intermediate flow path 68 and the discharge flow path 65*a* are communicated with each other and the discharge connection flow path 69 is blocked. Thus, the feed pipe 9 and the discharger 70 communicate with each other via the supply flow path 62*a*, the supply switching valve body 62, the first reservoir flow path 66, the first reservoir valve body 63 (or the second reservoir flow path 67 and the second reservoir valve body 64), the intermediate flow path 68, the discharge switching valve body 65, and the discharge flow path 65*a*.

As a result, the molten resin supplied from the feed pipe 9 is discharged to the discharger 70 without being filled in the first reservoir cylinder 10 and the second reservoir cylinder 20 through the reservoir switching valve 60. The molten resin is discharged to the disposer 72 via the discharge pipe 71 of the discharger 70. Therefore, the injection molding machine 1 can satisfactorily prevent clogging and backflow of the molten resin even in an event of a stoppage of the injection molding.

The injection molding machine 1 is not limited to the above-described embodiment, and various modifications can be adopted. For example, in the foregoing injection device 3, the plungers that move back and forth are applied as the first reservoir plunger 12 of the first reservoir cylinder 10 and the second reservoir plunger 22 of the second reservoir cylinder 20. However, the first reservoir plunger 12 and the second reservoir plunger 22 are not limited to these, and a screw that rotates around the axis in the first reservoir cylinder 10 and the second reservoir cylinder 20 and moves a molten resin to the distal end therein may be adopted. In this case, the feed pipe 9 may be configured to be connected to the proximal end sides of the first reservoir cylinder 10 and the second reservoir cylinder 20, and a molten resin is supplied by selecting the first reservoir cylinder 10 and the second reservoir cylinder 20. In this embodiment, the switching of the flow paths is realized by a T-shaped intersection of the flow paths; however, the flow paths may cross through at the intersection, and a flow path throttle valve or the like may be provided in the middle of each flow path and operated in the same manner as described above.

The injection molding machine 1 according to the embodiment disclosed herein is illustrative in all respects and not restrictive. The embodiment can be modified and improved in various forms without departing from the scope and spirit of the appended claims. The matters described in the plurality of embodiments can be combined with each other within a range not inconsistent with each other.

What is claimed is:

1. An injection molding machine, comprising:
- a first reservoir cylinder and a second reservoir cylinder to which a molten resin is supplied;
- a first injection member provided inside the first reservoir cylinder and configured to push out the molten resin in the first reservoir cylinder;
- a second injection member provided inside the second reservoir cylinder and configured to push out the molten resin in the second reservoir cylinder; and
- an injection cylinder to which the molten resin in the first reservoir cylinder and the molten resin in the second reservoir cylinder are supplied, wherein
- upon supply of the molten resin from the first reservoir cylinder to the injection cylinder, the injection molding machine supplies the molten resin to the second reservoir cylinder, and
- upon supply of the molten resin from the second reservoir cylinder to the injection cylinder, the injection molding machine supplies the molten resin to the first reservoir cylinder.

2. The injection molding machine according to claim 1, further comprising:
- a reservoir switch that is connected to a distal end of the first reservoir cylinder and a distal end of the second reservoir cylinder and configured to supply the molten resin to the first reservoir cylinder and the second reservoir cylinder.

3. The injection molding machine according to claim 2, wherein
- the reservoir switch is configured to perform switching between the first reservoir cylinder and the second reservoir cylinder to allow the molten resin continuously supplied via a feed pipe to flow into the first reservoir cylinder or the second reservoir cylinder.

4. The injection molding machine according to claim 3, further comprising:
- an injection switch connected to a distal end of the injection cylinder and connected to the reservoir switch, wherein
- the molten resin pushed out from the first reservoir cylinder or the second reservoir cylinder is supplied to the injection cylinder from the reservoir switch via the injection switch.

5. The injection molding machine according to claim 4, wherein
- the injection switch is configured to block communication with the reservoir switch in an injection step, and allow the molten resin supplied to the injection cylinder to be injected.

6. The injection molding machine according to claim 2, wherein
- the reservoir switch includes a discharger configured to discharge the molten resin during a stoppage of the injection molding machine.

7. The injection molding machine according to claim 1, further comprising:

a third injection member provided inside the injection cylinder and configured to push out the molten resin in the injection cylinder, wherein the molten resin is supplied to the first reservoir cylinder or the second reservoir cylinder while the third injection member is injecting the molten resin from the injection cylinder.

8. An injection molding machine system, comprising:

an injection molding machine configured to inject a molten resin into a mold device; and a molten resin supply device configured to supply the molten resin to the injection molding machine, the injection molding machine including a first reservoir cylinder and a second reservoir cylinder to which the molten resin is supplied, a first injection member provided inside the first reservoir cylinder and configured to push out the molten resin in the first reservoir cylinder, a second injection member provided inside the second reservoir cylinder and configured to push out the molten resin in the second reservoir cylinder, and an injection cylinder to which the molten resin in the first reservoir cylinder and the molten resin in the second reservoir cylinder are supplied, wherein upon supply of the molten resin from the first reservoir cylinder to the injection cylinder, the injection molding machine supplies the molten resin to the second reservoir cylinder, and upon supply of the molten resin from the second reservoir cylinder to the injection cylinder, the injection molding machine supplies the molten resin to the first reservoir cylinder.

* * * * *